United States Patent
Moulsley et al.

(10) Patent No.: US 9,113,480 B2
(45) Date of Patent: Aug. 18, 2015

(54) METHOD FOR OPERATING A RADIO STATION IN A MOBILE NETWORK

(75) Inventors: Timothy James Moulsley, Caterham (GB); Milos Tesanovic, Swindon (GB); Choo Chiap Chiau, Hertfordshire (GB); Robert James Davies, Milton (GB)

(73) Assignee: Koninklijke Philips N.V., Eindhoven (NL)

( * ) Notice: Subject to any disclaimer, the term of this patent is extended or adjusted under 35 U.S.C. 154(b) by 663 days.

(21) Appl. No.: 12/858,933

(22) Filed: Aug. 18, 2010

(65) Prior Publication Data
US 2011/0044187 A1 Feb. 24, 2011

(30) Foreign Application Priority Data

Aug. 18, 2009 (EP) .................................... 09168117
Apr. 6, 2010 (EP) .................................... 10305350
Jul. 28, 2010 (WO) ................. PCT/IB2010/053431

(51) Int. Cl.
H04J 1/16 (2006.01)
H04W 72/08 (2009.01)

(52) U.S. Cl.
CPC .................................. *H04W 72/082* (2013.01)

(58) Field of Classification Search
USPC ........................................ 370/252, 329, 431
See application file for complete search history.

(56) References Cited

U.S. PATENT DOCUMENTS

| 7,574,179 | B2 | 8/2009 | Barak et al. | |
|---|---|---|---|---|
| 8,150,345 | B2 * | 4/2012 | Roy et al. | 455/135 |
| 8,190,163 | B2 * | 5/2012 | Laroia et al. | 455/450 |
| 8,325,624 | B2 * | 12/2012 | Hammarwall et al. | 370/252 |
| 2005/0238111 | A1 | 10/2005 | Wallace et al. | |
| 2006/0094373 | A1 * | 5/2006 | Hottinen | 455/73 |
| 2006/0211441 | A1 * | 9/2006 | Mese et al. | 455/522 |
| 2008/0233967 | A1 | 9/2008 | Montojo et al. | |
| 2008/0274745 | A1 | 11/2008 | Barak et al. | |
| 2009/0109939 | A1 * | 4/2009 | Bhushan et al. | 370/337 |
| 2009/0197631 | A1 | 8/2009 | Palanki et al. | |
| 2009/0296788 | A1 * | 12/2009 | Hottinen | 375/219 |
| 2010/0296385 | A1 * | 11/2010 | Li | 370/210 |
| 2010/0323625 | A1 * | 12/2010 | Kishigami et al. | 455/65 |
| 2012/0020319 | A1 * | 1/2012 | Song et al. | 370/330 |

FOREIGN PATENT DOCUMENTS

| WO | 2005104399 A1 | 11/2005 |
|---|---|---|
| WO | 2009007722 A1 | 1/2009 |

OTHER PUBLICATIONS

Qualcomm Europe: "Advantages of CoMP Operation for Delay Sensitive Traffic in CSG Environment", 3GPP Draft, R1-092694, Jun. 234, 2009, pp. 1-8.
Qualcomm Europe "Signaling for Spatial Coordination in DL CoMP", 3GPP Draft, R1-092057, Apr. 28, 2009, pp. 1-10.
Motorola, "CoMP Operation Based on Spatial Covariance Feedback and Performance Results of Coordinated SU/MU Beamforming", 3GPP Draft, R1-09243, Jul. 7, 2009, pp. 1-11.
Philips: "DL MIMO for LTE-A: Interference Management Aspects", 3GPP Draft, R1-093554, Aug. 19, 2009, 3 pages.

* cited by examiner

*Primary Examiner* — Phuc Tran

(57) ABSTRACT

The present invention relates to a method for operating a secondary station comprising means for communicating with a primary station, the method comprising receiving from the primary station an interference status report, said interference status report comprising an spatial indication being representative of a spatial characteristic of the interference, measuring channel characteristics on reference symbols, and interpreting the measured channel characteristics with help of the interference status report.

30 Claims, 1 Drawing Sheet

METHOD FOR OPERATING A RADIO STATION IN A MOBILE NETWORK

FIELD OF THE INVENTION

The present invention relates to a method of communication in a communication system like a mobile communication system, for example UMTS, LTE or LTE Advanced.

More specifically, the invention relates to a method of communication using beamforming and, in some exemplary embodiments of the invention, cooperative beamforming, i.e. beamforming obtained by using primary station antennas from different cells.

BACKGROUND OF THE INVENTION

In a cellular telecommunication system as illustrated in FIG. 1, like a UMTS or LTE system, a plurality of secondary stations 110a-d like User Equipments, communicate within a cell 100a with the primary station 101a operating the cell. In such a system, the primary station 101a and the secondary stations may each comprise an antenna array comprising a plurality of antennas. These antennas may be used to communicate in a MIMO mode by beam forming. Complex coefficients applied on the transmitting antennas of the transmitting station, here the primary station 101a and/or on the receiving station, here the secondary stations 110a-d enable the creation communication streams each of which are associated with one or more spatial channels.

In order to provide to the primary station 101a with knowledge of transmission conditions experienced by the secondary stations so that a suitable transmission mode is selected, the secondary stations may measure some parameters like attenuation, SINR, interference etc. . . . Then, the secondary stations may feedback reports representative of these conditions like an achievable data rate (as in CQIs) or indication of propagation loss.

However, the secondary station computes this kind of feedback on the basis of its local measurements, although it has no overview of the network nor of the whole system resources.

SUMMARY OF THE INVENTION

It is an object of the invention to propose a method of operating a system which alleviates the above mentioned problem.

It is another object of the invention to propose a method of operating a system which enables the secondary station to have a better knowledge of its environment.

It is still another object of the present invention to propose a method of operating a system that enables the secondary stations to be aware of the interference sources without causing a huge cost of overhead.

To this end, in accordance with a first aspect of the invention, a method is proposed for operating a primary station comprising means for communicating with a plurality of secondary stations, the method comprising the step of the primary station signalling to at least one secondary station an interference status report, said interference status report comprising an spatial indication being representative of a spatial characteristic of the interference.

In accordance with a second aspect of the invention, a method is proposed for operating a secondary station comprising means for communicating with a primary station, the method comprising receiving from the primary station an interference status report, said interference status report comprising an spatial indication being representative of a spatial characteristic of the interference, measuring channel characteristics on reference symbols, and interpreting the measured channel characteristics with help of the interference status report.

In accordance with a third aspect of the invention, a primary station is proposed comprising means for communicating with a plurality of secondary stations, the primary station comprising a transmitter for signalling to at least one secondary station an interference status report, said interference status report comprising an spatial indication being representative of a spatial characteristic of the interference.

In accordance with a fourth aspect of the invention, a secondary station is proposed comprising means for communicating with a primary station, the secondary station comprising a receiver for receiving from the primary station an interference status report, said interference status report comprising an spatial indication being representative of a spatial characteristic of the interference, control means for measuring channel characteristics on reference symbols, the control means being adapted for interpreting the measured channel characteristics with help of the interference status report.

As a consequence, the secondary station has an indication on the spatial shape of the interference, like the spatial distribution of the interference. In an exemplary embodiment of the invention, the spatial indication comprises an indication on how localised is an interference. Thus, the secondary station may take this into account when estimating an achievable data rate. Moreover, the primary station is able to have a good view on the spatial distribution of the interference, and on the characterization of such interferences. Indeed, most of the interference is due to the neighboring cells and it is common that a primary station operates for at least two cells.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
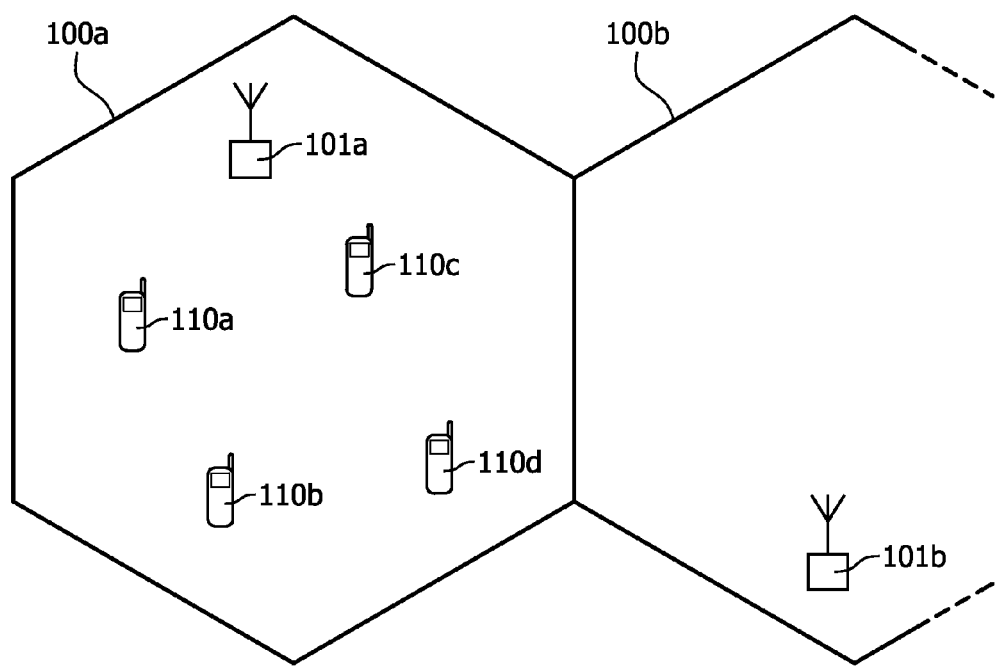
FIG. 1, already described, is a block diagram of a mobile network in which the invention is implemented.

The present invention relates to a mobile communication network as a UMTS or a LTE network, where each cell is operated by a primary station, which communicates with a plurality of secondary stations. Downlink communications from the primary station are carried out on a plurality of channels, some channels being dedicated to user data, and other channels to control data for signalling of transmission parameters for controlling the communications from the primary station to the secondary station. The channels may be defined by multiplexing of one or more of time, frequency or code. The same applies for uplink channels.

In an exemplary embodiment based on the LTE example, a single carrier of up to 20 MHz is used. A control signalling message for example on the Physical Downlink Control Channel (PDCCH) may be used to signal allocations of transmission resources. On the PDCCH, the primary station may signal transmission parameters, e.g. precoding vectors/matrices which allow the secondary station (or User Equipment noted UE) to compute phase reference(s) for demodulation of downlink data from common reference symbols. Reference symbols that are precoded specifically for a considered secondary station (UE specific Demodulation Reference Symbols or UE specific DRS) are also supported as an option, but only for a single spatial channel. A spatial channel may be defined by the combination of transmission parameters like a modulation sequence, a time/frequency resource, and/or a beamformed stream.

In the advanced forms of LTE networks, UE specific DRS are also proposed to aid reception of downlink data transmissions from the primary station. The DRS may occupy some of the resource elements (REs) in each resource block. Transmission of multiple spatial channels to a secondary station would require a set of DRS for each spatial channel. The set of DRS for each spatial channel is precoded in the same way as the data for that spatial channel, and since the locations and symbol values of the DRS are known to the secondary station, they can be used as a phase and amplitude reference for demodulation of data transmitted on that spatial channel. Equivalently, the DRS can be used to obtain a channel estimate of the combined channel formed by the precoding and the radio channel. The precoding for a spatial channel can be considered to create an antenna port and the set of DRS for that spatial channel are thus transmitted on the corresponding antenna port.

The set of DRS for each spatial channel could be distinguished by one or more of:

Frequency domain (FDM) i.e. the REs used for sending DRS differ in the frequency domain with e.g. different frequency carriers;

Time domain (TDM) i.e. the REs used for sending DRS differ in the time domain;

Different sequences of values transmitted in each of REs used for sending DRS (i.e. CDM). In this case it would be convenient to use the same set of REs for sending each set of DRS for each spatial channel.

In practice the DRS for a given spatial channel may comprise aspects of all three: FDM, TDM, and CDM. For a given secondary station, it would be advantageous if no data is sent (on any spatial channel) in any RE used for DRS since this would avoid any interference between data and the DRS which would otherwise reduce the accuracy of the channel estimate obtained by the secondary station. For FDM, TDM and CDM this would imply that the REs used for any DRS are not available for data on any spatial channel.

Moreover, in accordance with an example of this embodiment, the sets of DRS are mutually orthogonal so that independent channel estimates can be obtained in the case that more than one set of DRS are transmitted at the same time. Two sets of DRS are orthogonal when their product equals zero. For instance, in case of TDM, two symbols are orthogonal if they are not overlapping in time. For FDM, two symbols are orthogonal if their respective frequency carriers are different. For CDM, two symbols are orthogonal if the product of their respective modulation sequences equals zero. In principle the maximum number of spatial channels which could be supported for a single Resource Block would depend on the modulation order and the total number of REs allocated for DRS (i.e. maximum number of orthogonal sequences available). In practice the maximum is likely to be set at a lower level, for example such that the total number of REs allocated to DRS is equal to a multiple of the maximum number of allowed spatial channels, e.g. a set of 2 DRS for each spatial channel.

Then, the following are among the possible ways of designing the system:

The number REs allocated for DRS is proportional to the number of spatial channels actually transmitted to a secondary station UE. This would be applicable for FDM or TDM. It has the advantage of minimising the overhead from DRS when fewer spatial channels are transmitted than the maximum.

The number REs allocated for DRS is fixed (e.g. as a multiple of the maximum number of spatial channels which may be transmitted to a secondary station). This would be a natural consequence of using CDM. For FDM and TDM as well as CDM it would also allow different spatial channels to be transmitted to more than one secondary station simultaneously. This would require that a UE was aware of which set of DRS it should use as references for receiving its data (and which DRS corresponded to which part of the data stream).

However, as illustrated on FIG. 1, a secondary station 110d at the edge of cell 100a may receive DRS simultaneously from more than one cell, here from cell 100b. In this case it is convenient to operate the system such that the same frame timing is used in adjacent cells and also such that DRS from different cells can be distinguished (e.g. by FDM/TDM/CDM). If the secondary station 110d can identify different DRS from different cells 100a or 100b, and has multiple receive antennas then it open the following possibilities:

in an example, the secondary station 110d may receive a data transmission from a wanted cell and adjust its receive weights to reject the spatial channels from other cells.

on the contrary, the secondary station 110d may adjust its receive weights for receiving simultaneously data transmissions from a plurality of cells, here 100a and 100b (e.g. using different spatial channels and different DRS).

Thus, it is advantageous for the secondary station to be able to distinguish DRS from different cells using different symbol sequences, as long as this would not increase the number of REs needed for DRS. However the performance of this approach is lower with rapidly changing channels. As an example, it is proposed in accordance with an embodiment of the invention, that the DRS from different cells are orthogonal (or nearly orthogonal).

In the particular example of LTE, an implementation of such a system would be as follows:

The maximum number of spatial channels which may be transmitted to one UE in one cell is 8. Note that in itself this would limit the total number of spatial channels being transmitted in a cell.

The number of REs for DRS in one Resource Block may be a number such as 12 or 24.

It is assumed that the DRS design will allow some interpolation of the channel coefficients across one Resource Block, at least in some circumstances.

In such a system, the secondary station may have multiple receive antennas (e.g. 2, 4 or 8) in an antenna array. The term antenna port is also used for defining for example a set of antennas used for receiving or transmitting a single stream with a single reference symbol.

In order that the primary station can schedule downlink data transmissions to be make efficient use of system resources, a secondary station is typically expected to provide the primary station with feedback on the downlink channel state, for example:—

Implicit feedback, under the assumption of a particular
transmission scheme, comprising one or more of:
Preferred transmission rank
Preferred precoding matrix or vector(s)
Data rate that could be received (e.g. CQI)
Explicit feedback, comprising one or more of:—
Channel transfer function
Interference power
Interference covariance matrix Such feedback would typically be based on observation of periodically transmitted reference symbols designed for this purpose (i.e. CSI-RS), and estimates of interference. The feedback may be broadband (e.g. covering the entire carrier bandwidth) or frequency selective, covering parts of the carrier bandwidth.

Different assumptions are possible for the interference, for example:
Spatially white meaning that the interference level is substantially spread all around the secondary station;
Spatially localized meaning that the interference level is only high at some locations around the secondary station;
Uniform in the frequency domain;
Frequency selective;
Constant in the time domain, or
Time varying The secondary station could determine appropriate assumptions itself by observation of the signals at its antenna outputs. Then, if the interference is spatially localised, the secondary station may be able optimize receiver processing (i.e. selection of antenna weights) in order to mitigate the effect of the interference and maximise SINR. Otherwise the secondary station should apply MRC (Maximum Ratio Combining) Calculation of antenna weights would be based on an estimate the spatial signature of the interference at the secondary station. These weights could be applied to reception of data transmissions as well as reporting the channel quality (e.g. CQI).

If the interference is frequency selective or time varying (e.g. with an identifiable pattern), this would lead to higher CQI values corresponding to parts of the spectrum with lower estimated interference.

One problem with using only the secondary station measurements is that interference environment in any future subframes may be different to that derived from past history.

Note that in practice the spatial characteristics of the interference may be more complex, for example multiple localised sources, or a combination of localised and spatially white components. This information may be in the form of a covariance matrix.

In accordance with a first embodiment of the invention, in a system as shown on FIG. 1, the primary station 101 may transmit to one or more of the secondary stations 100*a*-*d* in its cell information regarding the spatial distribution of the interference. This information may be enclosed in an interference status report. Such an interference status report may comprise the whole covariance matrix computed by the primary station or based on the reports from the secondary stations. However, such covariance matrix may represent too much overhead. As a consequence, it is proposed in some variants of the invention explained below to provide with other type of interference report.

The primary station has indeed a better knowledge of the interference, and more power to measure such interference. The knowledge may be acquired from measurements or from the reports of the other secondary stations.

The reports may be a representation of the spatial distribution of the interference, for instance by giving some directions or locations of high level of interference. However, in order to minimise the size of the reports, it is also possible to provide some short reports (in combination or alone with long reports) indicative of whether the interference is localized or spread all around the secondary station in a uniform manner. In complement with the indication that interference is localized, a useful indication is the number of localized interference sources.

Since the situation may be a combination of uniform interference with localized sources, the interference reports may be in two parts to indicate this. A first part that could indicate the level of uniform interference, and a second part indicative of the number of localized sources which are to be taken into account along the spatially uniform interference source.

Figure 2:
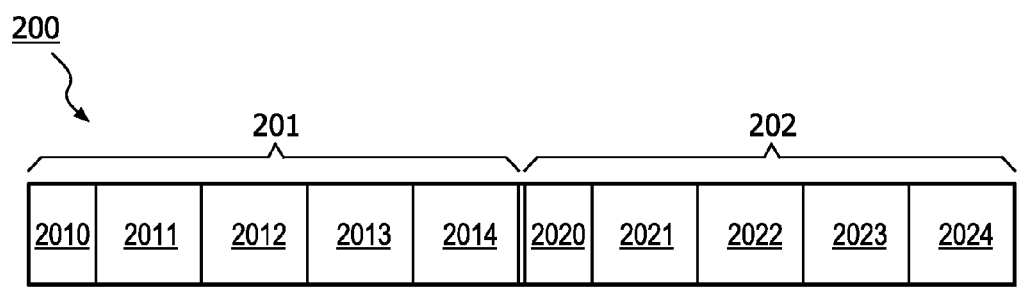
FIG. 2 is a schematic view of an interference report as transmitted in an exemplary embodiment.

As shown on FIG. 2, an example of interference report 200 comprises a uniform interference field 201 dedicated to the spatially uniform interference providing with for instance levels of interference. These values may be on average over the whole bandwidth or over subbands 2011-2014 as shown on FIG. 2. Values equal to zero may indicate that no uniform interference is encountered in this particular subband. In order to reduce the size of the report, the size may be dynamically reduced with a uniform interference indicator 2010, which depending on its value may indicate the presence/absence of the subsequent fields.

A second field 202 may be representative of the localized components of the interference. Similarly, a localized interference indicator 2020 may indicate the presence/absence of the subsequent fields or indicate the number of localized interference sources. Thus, it defined the number of subsequent fields to describe all the sources. The subsequent fields 2021-2024 are representative of a general direction from the secondary station or from the primary station of at least some of the localized interference sources. Here, four sources general directions are given in the subfields 2021-2024.

As a variant, it is possible to indicate which frequency subbands of the bandwidth are experiencing spatially uniform interference. It is as well possible to indicate on which sub bands of a frequency domain the interference report is applicable, and for which period. A timing indication may be representative of a validity period of the report or of the time at which the report was estimated. Thus, the secondary station may derive a confidence level from the timing indication and have a derived assumption if the report is not recent.

The timing indication may also indicate a variation rate of the interference spatial distribution, which permits to the secondary station to derive a time of validity of the report. Moreover, if the interference are periodical, this timing indication may be a periodicity of the interference spatial distribution.

With help of this interference status report, the secondary station may then make some measurements based on the indications of the report, for instance measurements on reference symbols. These measurements may be used for sending an estimate of an achievable data rate and the preferred transmission parameters, like CQI, to the primary station.

In a variant of this embodiment, the secondary station may use the interference status report to optimize its receiving weights for a MIMO communication with the primary station. Indeed, the indication of the location of the interference sources may permit to compute weights reducing the sensitivity of reception in a particular direction.

In accordance with embodiments of the invention, it is proposed that the secondary station is given assistance in determining assumptions about the interference environment by the primary station. This is feasible since much of the interference experienced by the UE is under the control of the primary station, arising for example, from transmissions in other cells controlled by the same primary station, or on spatial channels transmitted to other UEs in the same cell. In addition the primary station may have some knowledge of interfering transmissions generated by cells controlled by other primary stations. For example, some forms of interference co-ordination may lead to restricting high power transmissions in a given cell to a particular part of the frequency domain.

Providing the secondary station with the full interference covariance matrix (even if it was known at the primary station) would lead to significant overhead. More compact representation of information is required.

Therefore, in accordance with an embodiment of this invention, the primary station could signal to the secondary station on of the following:—
- Whether the interference should be assumed to be spatially uniform or spatially localised
  - The parts of the frequency domain over which it should be assumed to be spatially uniform
  - The parts of the frequency domain over which it should be assumed to be spatially localised In addition, other interference characteristics could be indicated:—
- The number of spatially localised interference components
- Whether the interference should be assumed to be a mixture of localised and spatially white components
- Whether the interference should be assumed to be uniform in the frequency domain or frequency selective. Or in more detail:
  - The parts of the frequency domain over which it should be assumed to be uniform
  - The parts of the frequency domain over which it should be assumed to be frequency selective
- Whether the interference should be assumed to be uniform in the time domain or time varying. Or in more detail
  - The periodicity of interference variation.
  - The timing of the interference variation
- The time interval over which particular assumptions should be maintained The secondary station can derive useful information on the interference environment by monitoring the various DRS sequences. Typically, if a spatial channel is being transmitted in a given cell (or a nearby cell) the channel estimate derived from the corresponding DRS sequence could give an indication of the presence of a corresponding interfering data transmission. On the other hand if the spatial channel is not being transmitted, the channel estimate should be interpreted as an indication of background noise or spatially white interference power. Therefore it could be advantageous for the primary station to signal to the secondary station whether particular DRS sequences should be assumed to correspond to transmitted spatial channels or assumed to be background noise. This would be particularly relevant if particular DRS sequences were used preferentially (e.g. more or less continuously, or over a wide bandwidth in a particular cell).

For receiving a single spatial channel in the presence of spatially white interference the UE would be expected to use the channel estimate derived from measurements on the associated DRS sequence to provide a phase and amplitude reference for demodulation. In this case, for multiple receive antennas at the secondary station, antenna weights derived assuming MRC would be appropriate. However, in the presence of additional spatial channels and/or spatially non-uniform interference different antenna weights would provide a better SINR. To compute suitable antenna weights the UE can use the DRS sequences associated with the other spatial channels on which it is receiving data, and any estimate of the spatial characteristics of the interference, which could be derived from the associated DRS sequences. Therefore, to improve UE receiver performance the primary station can provide information on the interference characteristics, such as an indication of:—
- the DRS sequences which are also being used in the same cell (e.g. a serving cell or anchor cell) for transmission to other UEs
- the DRS sequences which are being used in adjacent cells for transmission to other UEs Such indications could inform the UE whether it should assume that its own measurements of particular DRS sequences are to be interpreted on the basis of spatially white interference or on the basis of spatially localised transmissions.

If the information on DRS sequences in use is carried together with a downlink assignment in PDCCH, this could also imply a particular part of the frequency spectrum (e.g. the resources in the assignment message). It could also indicate a particular part of the time domain (e.g. the subframe of the corresponding PDSCH or a number of subsequent subframes).

The information on interference could be broadcast to all UEs, but it would then need to reflect average conditions in a cell.

In the case of carrier aggregation the information on interference could be specific to particular component carriers.

Informing the UE of the DRS sequences in use is equivalent to providing an indication of the number of localised spatial interference sources.

The information on interference may be provided to the UE in response to a request from the UE.

In another example of the invention based on a system like LTE, the UE is informed by signalling (or can deduce) the number of downlink antennas available in a cell, and the set of DRS sequences which are potentially available. The UE is informed by higher signalling from the primary station (e.g. using a bitmap with one bit per resource block) if the interference in a particular resource block should be assumed to be spatially localised (e.g. bit map value set to "1") or not (e.g. bit map value set to "0"). If the interference is indicated to be not spatially localised the UE derives CSI and CQI assuming MRC. If the interference is indicated to be spatially localised the UE derives CSI and CQI assuming weights designed to optimise SINR (e.g. zero forcing).

Additionally or alternatively the secondary station is informed using a flag whether the interference should be assumed to be frequency selective or not. If the interference is indicated not to be frequency selective the UE derives CSI and CQI assuming uniform interference across the frequency domain.

Additionally or alternatively the UE is informed using a flag whether the interference should be assumed to be time varying or not. If the interference is indicated not to be time varying the UE derives CSI and CQI assuming constant interference in the time domain.

Another variant is like the previous example except that the assumption about the spatial characteristics of the interference are indicated to the UE by signalling from the primary station if a particular DRS sequence should be assumed to be in use (e.g. using a bitmap with one bit per DRS sequence). If a DRS sequence is in use the UE may assume that the corresponding channel estimate indicates the spatial signature of the interference associated with that DRS. Otherwise the UE may assume that the channel estimate may be used to estimate the power of a spatially white interference component. In this case the information on DRS use may be sent via the PDCCH when the UE is assigned downlink resources, and can be used to optimise receiver processing of data sent via PDSCH.

In an extension to this variant, the secondary station is informed by signalling from the primary station (e.g. using a bitmap with one bit per DRS sequence) if the DRS sequence should be assumed to be use in the same cell or not.

In a further extension of this variant, the secondary station is informed by signalling from the primary station (e.g. using a bitmap with one bit per DRS sequence) if the DRS sequence should be assumed to be use in a nearby cell or not.

It is to be noted that the primary station may indicate one or more of
- Whether a particular reference sequence should be assumed to be in use
- The number of spatial interference sources
- Whether a particular reference sequence should be assumed to be in use in the same cell
- Whether a particular reference sequence should be assumed to be in use in an adjacent cell
- Whether the interference should be assumed to be uniform across the frequency domain or frequency selective
- Whether the interference should be assumed to be uniform in the time domain or time varying
- The frequency range over which particular assumptions are applicable
- Periodicity of time varying interference
- The time interval over which particular assumptions are applicable The invention is applicable to mobile communication which may include LTE-Advanced. The cells may be located a single base station site, or on different sites, for example femto-cells implemented by fibre radio techniques.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a base station in a mobile network for communicating with at least one secondary station, the method comprising:
    signaling from the base station to the at least one secondary station an interference status report, said interference status report characterizing at least some of the interference generated by the mobile network and impacting reception of transmissions from the base station to the at least one secondary station, said interference status report comprising at least one of a spatial indication being representative of a spatial characteristic of the interference, and a time indication being representative a temporal characteristic of the interference, and a frequency indication being representative of a frequency characteristic of the interference
    receiving from the at least one secondary station an estimate of an achievable data rate for transmission from the base station to the secondary station based on interpreted measured channel characteristics.

2. The method of claim 1, wherein the spatial indication is representative of the spatial distribution of the interference.

3. The method of claim 2, wherein the spatial indication indicates whether the interference is spatially uniform or spatially localised.

4. The method of claim 3, wherein the spatial indication indicates on which sub bands of a frequency domain the interference is spatially uniform.

5. The method of claim 1, wherein the spatial indication indicates that the interference is partially spatially uniform and partially spatially localized.

6. The method of claim 1, wherein the spatial indication further indicates that the interference is at least partially spatially localized and indicates a number of localized interference sources.

7. The method of claim 6, wherein the spatial indication is representative of the direction of at least some of the localized interference sources.

8. The method of claim 1, wherein the spatial indication further comprises an indication on which sub bands of a frequency domain it is applicable.

9. The method of claim 1, wherein the interference report further comprises a validity period during which the interference status report should be considered as valid.

10. The method of claim 1, wherein the time characteristic is at least one of the following: a variation rate of the interference spatial distribution, a periodicity of the interference spatial distribution, a variation rate of the interference, a periodicity of the interference.

11. A method for operating a secondary station, the method comprising:
    receiving from the base station an interference status report, said interference status report characterizing at least some of the interference generated by the mobile network and impacting reception of transmission from the base station to the at least one secondary station, said interference status report comprising at least one of a spatial indication being representative of a spatial characteristic of the interference, and a time indication being representative a temporal characteristic of the interference, and a frequency indication being representative of a frequency characteristic of the interference,
    measuring channel characteristics on reference symbols transmitted from the base station,
    interpreting the measured channel characteristics with the help of the interference status report, and
    sending an estimate of an achievable data rate for transmission from the base station to the secondary station based on the interpreted measured channel characteristics.

12. The method of claim 11, wherein said interference status report comprises a spatial indication being representative of a spatial characteristic of the interference.

13. The method of claim 11, wherein the secondary station comprises a plurality of antennas for receiving at least one transmission stream from the base station, and wherein the secondary station computes receiving weights on the basis of at least the interference status report.

14. The method of claim 11, where the at least one transmission stream is a MIMO transmission stream.

15. The method of claim 11 wherein the secondary station computes an indication of an achievable data rate on the basis of at least the interference status report.

16. A base station for communicating with a plurality of secondary stations, the base station being configured to
    (a) transmit to at least one secondary station an interference status report, said interference status report characterizing at least some of the interference generated by the mobile network and impacting reception of transmissions from the base station to the at least one secondary station, said interference status report comprising a spatial indication being representative of a spatial characteristic of the interference, (b) receive from the at least one secondary station an estimate of an achievable data rate for transmission from the base station to the secondary station based on interpreted measured channel characteristics.

17. The base station of claim 16, wherein the spatial indication is representative of the spatial distribution of the interference.

18. The base station of claim 17, wherein the spatial indication indicates whether the interference is spatially uniform or spatially localized.

19. The base station of claim 18, wherein the spatial indication further comprises an indication on which sub bands of a frequency domain it is applicable.

20. The base station of claim 16, wherein the spatial indication indicates that the interference is partially spatially uniform and partially spatially localized.

21. The base station of claim 16, wherein the spatial indication further indicates that the interference is at least partially spatially localized and indicates a number of localized interference sources.

22. The base station of claim 16, wherein the spatial indication is representative of the direction of at least some of the localized interference sources.

23. The base station of claim 22, wherein the spatial indication indicates on which sub bands of a frequency domain the interference is spatially uniform.

24. The base station of claim 16, wherein the interference report further comprises a validity period during which the interference status report should be considered as valid.

25. The base station of claim 16, wherein the time characteristic is at least one of the following: a variation rate of the interference spatial distribution, a periodicity of the interference spatial distribution, a variation rate of the interference, a periodicity of the interference.

26. A secondary station for communicating with a base station, the secondary station being configured to (a) receive an interference status report from the base station, said interference status report characterizing at least some of the interference generated by the mobile network and impacting reception of transmissions from the base station to the at least one secondary station, said interference status report comprising a spatial indication being representative of a spatial characteristic of the interference, (b) measure channel characteristics on reference symbols, and (c) interpret the measured channel characteristics with the help of the interference status report, (d) send an estimate of an achievable data rate for transmission from the base station to the secondary station based on the interpreted measured channel characteristics.

27. The secondary station of claim 26, wherein said interference status report comprises a spatial indication being representative of a spatial characteristic of the interference.

28. The secondary station of claim 26, wherein the secondary station comprises a plurality of antennas for receiving at least one transmission stream from the base station, and wherein the secondary station computes receiving weights on the basis of at least the interference status report.

29. The secondary station of claim 26, where the at least one transmission stream is a MIMO transmission stream.

30. The secondary station of claim 26, wherein the secondary station computes an indication of an achievable data rate on the basis of at least the interference status report.

* * * * *